(12) United States Patent
Arkadi

(10) Patent No.: US 8,578,880 B2
(45) Date of Patent: Nov. 12, 2013

(54) METHOD OF DYNAMIC MILKING

(75) Inventor: Relin Arkadi, Langhorne, PA (US)

(73) Assignee: REMCO International, Inc.

( * ) Notice: Subject to any disclaimer, the term of this patent is extended or adjusted under 35 U.S.C. 154(b) by 392 days.

(21) Appl. No.: 12/452,342

(22) PCT Filed: Jun. 27, 2008

(86) PCT No.: PCT/US2008/008095
§ 371 (c)(1),
(2), (4) Date: Apr. 23, 2010

(87) PCT Pub. No.: WO2009/008969
PCT Pub. Date: Jan. 15, 2009

(65) Prior Publication Data
US 2011/0239942 A1 Oct. 6, 2011

(51) Int. Cl.
*A01J 5/007* (2006.01)
(52) U.S. Cl.
USPC ........................................ 119/14.02
(58) Field of Classification Search
USPC ............ 119/14.02, 14.25, 14.31, 14.4, 14.41, 119/14.42, 14.44
See application file for complete search history.

(56) References Cited

U.S. PATENT DOCUMENTS

| | | | | |
|---|---|---|---|---|
| 1,408,695 A | * | 3/1922 | Dinesen | 119/14.37 |
| 2,467,512 A | * | 4/1949 | Weiby | 137/565.34 |
| 4,011,838 A | * | 3/1977 | Nordegren et al. | 119/14.08 |
| 5,090,359 A | * | 2/1992 | Pettersson et al. | 119/14.08 |

* cited by examiner

*Primary Examiner* — Rob Swiatek
*Assistant Examiner* — Danielle Clerkley

(57) ABSTRACT

In a method of dynamic milking, is performed a given modulating of values of airflow-forming pressures in a first working zone in a negative drive cycle and in a second working zone in a positive drive cycle of a cyclic drive unit, for providing and energy-physiological optimization of given periodic dynamic in-phase vacuum and mechanical actions on a surface of a milking teat in a two-chamber teat cap with a hermetic chamber connected with a source of a chamber pressure, whose movable part of a wall realizes the mechanical actions only on a lateral surface of the teat without interrupting of a spatial channel for movement of milking milk between an open output of the milking channel of the teat and a constantly open milk output of the teat cup during a dynamic milking process.

1 Claim, 4 Drawing Sheets

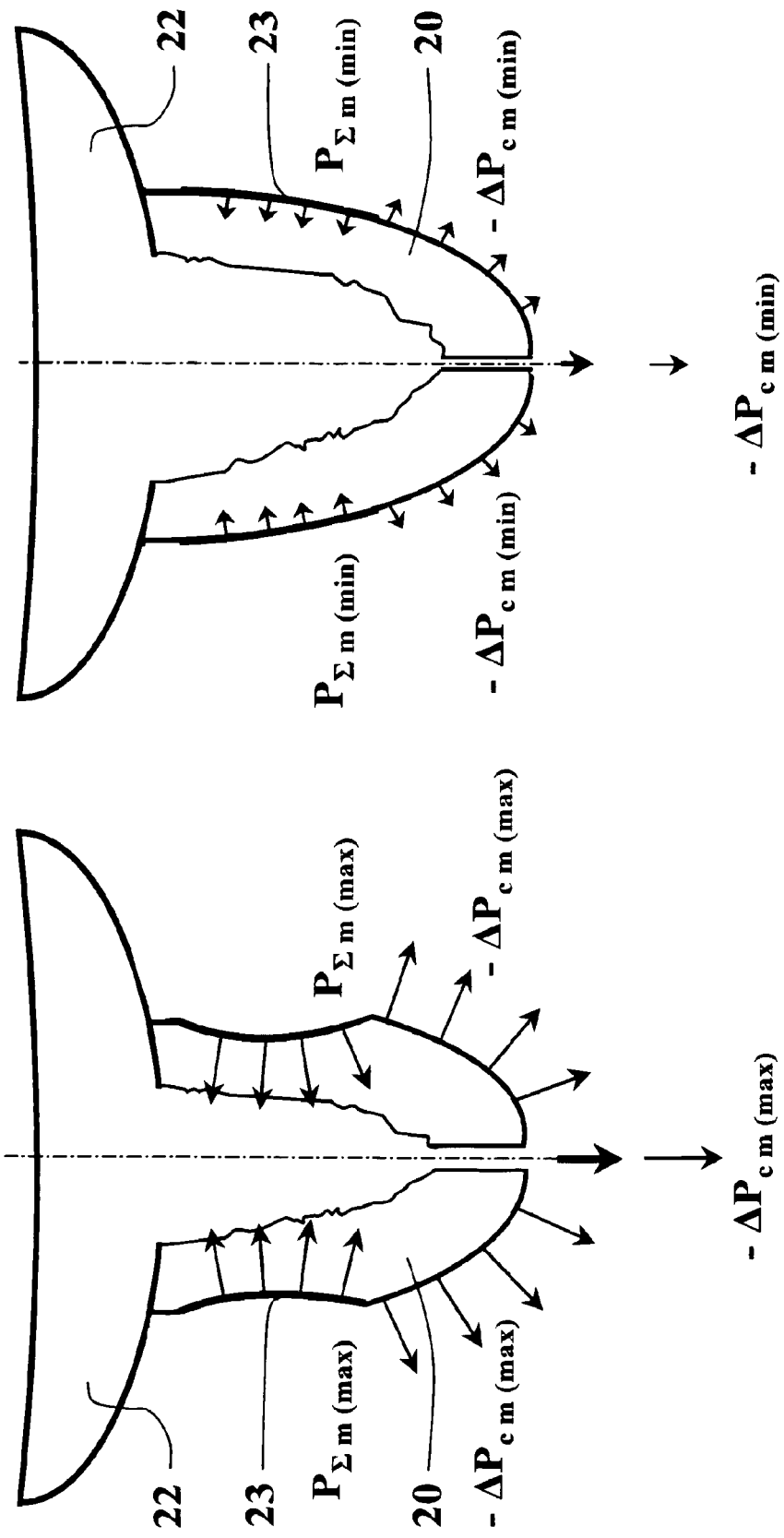

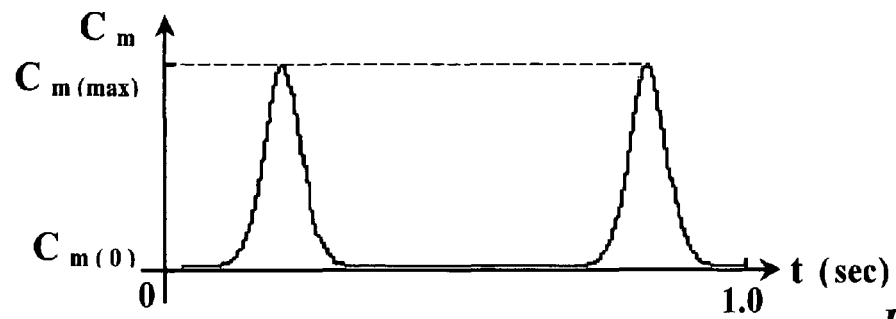
FIG. 5
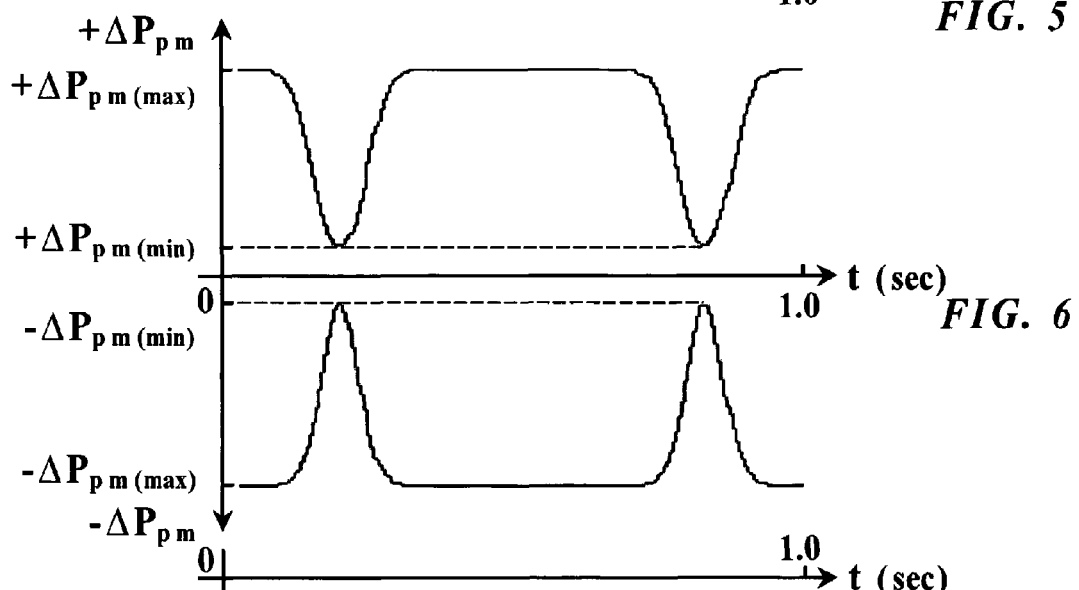
FIG. 6
FIG. 7
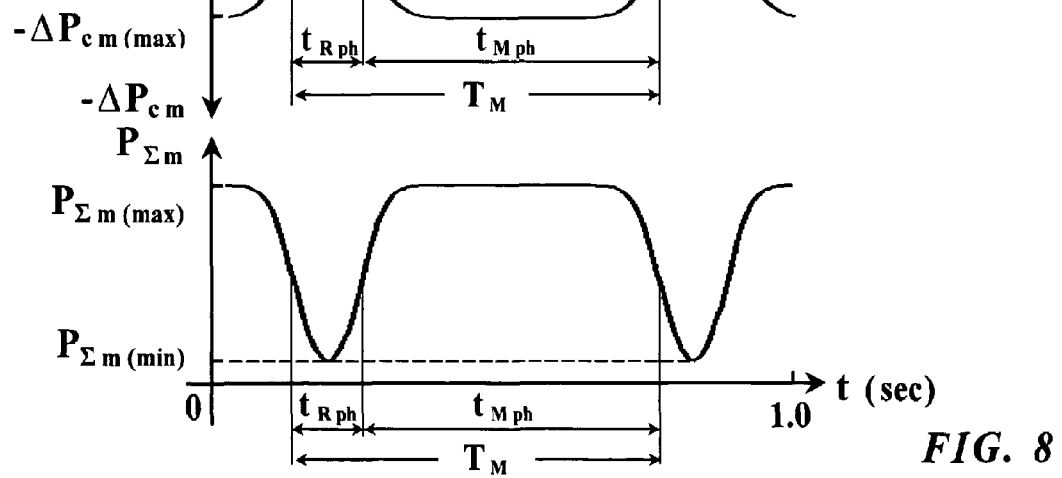
FIG. 8

METHOD OF DYNAMIC MILKING

TECHNICAL FIELD

The present invention relates to methods and devices (systems) used mainly in dairy industry, for providing a machinery milking process of animals, for example cows, sheep, goats, horses. In addition the present invention also can be used for providing series of other similar physiological processes, which take place with the use of external actions on certain parts of body or organs of a human being (animal) and connected with a possible artificial selection from them of a liquid physiological substance of a certain type.

BACKGROUND ART

Several methods, which provide various types of milking process of animals, are known. The most optimal and efficient periodical milking process is provided for example by a calf during its sucking action on a milking teat of a cow for performing a natural selection of milk from it (during period of feeding). Such "reference" natural milking process carries out optimal modulating in-phase vacuum-mechanical actions on the teat. During this periodic process of mechanical action on the milking teat (compression) and is carried out by the muscles' lips of the calf and a simultaneous in-phase periodic vacuum action on the milking teat, created in an expanding volume of a closed mouth cavity of the calf during suction of milk. As researches showed, the optimal frequency of the said modulating in-phase periodic actions on the milking teat carried out by the calf is approximately 1.3-2.0 Hz. A milk channel of the milking teat is continuously open during movement of a milk flow into a mouth cavity of a calf (both in a main "milking phase" and in a "resting phase" of each period of the periodic milking process). The natural limitation of a possible lengthening of the milking teat in a periodic process of sucking modulating action on it is absent. At the same time the said periodic mechanical action of the lips of a calf on the side surface of the milking teat (for its deforming compressing) provides optimization of the limitation of the possible volume expansion of the side surface of the milking teat under the action of periodic modulating vacuum action on it. The determining characteristic of this process is a in-phase performance of said periodic increase of vacuum and mechanical actions on the milking teat in the said main "milking phase" and in-phase performance of decrease of said actions on the milking teat in the said "resting phase", for relaxation of physiological processes in the milking teat. The natural optimization of parameters of said natural milking process carried out by a calf comprises a frequency, a range and a law of periodic changes of the said actions on the milking teat (with consideration of physiological characteristics of animals which takes part in it) and predetermines the highest efficiency of said "reference" natural milking process. The latter is characterized by a natural optimal maximal milking efficiency of said milking process with optimal minimal energy spent by a calf for its performance. The minimal natural level of possible various known diseases of udder or milking teats of a milking animal is achieved.

It should be mentioned that similar characteristics of efficiency of other known milking processes (performed for example during realization of a known artificial "hands" milking method and some known machine milking methods developed over the last 175 years), are significantly different for known reasons in a negative sense from the above mentioned characteristics of the efficient "reference" natural milking process. This can be explained by the fact that none of the known milking methods realize the process which contains to the full extent of a whole combination of optimal modulating in-phase vacuum-mechanical periodic actions on the teat carried out by said "reference" natural milking method.

For example, a known mechanical hands milking method and known mechanical milking method was first proposed in England for facilitation of farmer's work approximately in 1830, carries milking processes which contain only periodic mechanical actions on the teat (for compressing deformation of its lateral surface). The absence in said milking processes of a vacuum action on the milking teat, which periodically changes in-phase with said periodically changing mechanical action on the milking teat (in the main "milking phase" and in the "resting phase") significantly worsens characteristics of milking efficiency with the use of said mechanical methods.

At the same time, another known vacuum machinery milking method proposed in England in approximately 1851 realizes a milking process, which contains only constant vacuum action on the teat. The main feature of this method is the use of the means of constant vacuum and a one-chamber teat cup. The value of the vacuum action is selected with consideration of the necessity to provide a reliable vacuum "suspension" of the teat cup on the teat and is significantly greater than a value necessary for carrying out of the milking process. This reason and absence in a milking process of a periodic change of said "increased" vacuum action on the milking teat, and also the absence of periodical changing in-phase with its mechanical action on the milking teat, which is necessary for periodic organization in this process of the "milking phase" and "resting phase" causes serious physiological problems which accompany the known milking process. They include mainly a outflow of blood and lymph to the end of a teat under constant "increase" vacuum action on it, and also constant swelling of a milking teat which is accompanied by deformation of its internal structure and leads to blocking of milk in the milking teat and in cavernous structure of the udder so as to provoke stagnating physiological processes which cause known diseases of milking teats and udders for example mastitis.

These negative factors lead as a result to significant reduction of quality of milk and worsening of characteristics of efficiency of the realized milking process, for example the animal sickness level, the milking productivity and the specific energy consumption of the milking process, which limits in principle the use of broad possibilities of the method in the milking industry. This method is used mainly for a short term carrying out of some physiological processes, which take place with the use of constant vacuum action, on certain parts of a body, or organ of a human being (animal) and connected with the possibility of artificial selection from them of a liquid physiological substance of a certain type, for example for an artificial selection of breast milk from nursing women.

The most widely used and traditional method which is developed approximately 100 years ago in a milking industry is a so-called pulsating machinery milking method which was first proposed in Scotland approximately in 1905. The main peculiarities of this known method is the use in a milking system of means of constant vacuum, two-chamber teat cup including an elastic liner and a pulsator providing amplitude-frequency characteristics and a law of operation with pulsations of the liner, by a given periodic commutation of pressures which are alternatingly supplied into the pressure chamber (negative pressure or atmospheric pressure) from corresponding sources of given chamber pressure. As a detailed analysis of this method shown, it realizes a milking process, which contains periodic pulsating phase opposition vacuum-mechanical action on the teat. Trying to technically imitate of the above mentioned "reference" natural milking process, carried out for example by a calf, this method is characterized by principally important process differences from it, which cause serious disadvantages of this traditional pulsating machinery of the milking method.

For example, a detailed analysis of all components of this pulsating milking process, with realization in it of the main "milking phase" with supply of vacuum from the pulsator into the said liner chamber—in an open position, allows to determine the following principle process differences and disadvantages of this phase of the milking process:

Presence in the two-chamber teat cup of an additional relatively bulky and heavy structural element, namely the liner, which causes the necessity of a significant increase of said maximum value of the vacuum generated in a cavity of the teat cup, which is selected with consideration with the possibility of providing reliability of its vacuum "suspension" on the milking teat. The maximum value of the vacuum significantly exceeds the value vacuum action of the teat, which is sufficient for providing efficient milking process, and also significantly exceeds a maximum value of the vacuum, which is sufficient for carrying out the vacuum milking method.

Absence in this phase of the milking process of mechanical action of the milking teat, which changes in-phase with the vacuum action on the milking teat and the deforming compression which is necessary for its organization with a simultaneous mechanical side limitation to volume expansion of the milking teat in the process of realization of the main "milking phase". It is obvious that excretion of milk from the milking teat in this phase is accompanied by significant deformations of puling of a teat during sucking action of the vacuum, and not deformations of compression of side surface of the teat (compression out of milk), as takes place in the analogous phase of the "reference" natural milking process. This circumstance makes this phase of the pulsating milking process in the process sense to be completely identical to the process realized in the vacuum machinery milking process method.

Therefore, during realization of the "milking phase" only constant and maximal substantially excessive in the magnitude vacuum acts on the milking teat, which predetermines and significantly worsens serious physiological problems described above in the analysis of the vacuum machinery milking method. It is known that excessive vacuum which acts on the teat leads to affecting of the teat tissue, it can cause a discomfort due to substantial concentration of swellings in the milking teat and also causes pain for animal (cow), increases the probability of pulling the teat deeper into the teat cup, with compressing of the udder, makes difficult or even blocks milk outflow causing an incomplete milking. It also causes a production of stress hormone (adrenaline), which in turn contributes to a significant worsening of quality of milk and impeding of milk production. For these reasons, it is necessary in principle to in substantially limit the length of the "milking phase" (50-70%) within each period of the periodic of realization milking process, which substantially increases the total time of milking process and its specific energy consumption.

At the same time, the detailed analysis of all components of the pulsating milking process, during the realization of it of the "resting phase" with supply of atmosphere pressure or from a said pulsator into a liner chamber, with the liner in a closed position, allows to emphasize other principally important process differences and disadvantages of this phase of the milking process:

Presence in said phase of milking process of mechanical action on the milking teat, caused by the collapsing liner which compressed it, which is absent in an analogous phase of the "reference" natural milking process;

Presence of complete interruption of a channel for movement of milk from the teat which is caused by the collapsing liner for providing a given minimization of the value of vacuum action of the teat, which also is absent of the analogous phase of the "reference" natural milking process.

The above-mentioned "resting phase" principal process differences, which are introduced in the further, worsen the above-described problems of the pulsating milking process. The researches showed that in the mode of phase opposition vacuum-mechanical actions on the teat when the mechanical action on the teat is increased and the vacuum action on the milking teat is decreased, the process of relaxation of its inner structure starts, the outflow of blood and lymph to the end of milking teat is minimized, the milk unblocked in the inner cavity of the milking teat and in the cavernous structure of the teat. During this period of time the above-mentioned factors positively contribute to the process of maintenance of flowing out of milk from the channel of the teat. However, simultaneously with this, a hydrodynamic shock action of the flow of milk on a "closure", takes place, which is technically artificially created during closing of the lower part of the liner, which predetermines the possibility of a "reverse flow" of milk during milking. Simultaneously with this, a traumatizing hydrodynamic shock action is formed from the reverse flow of milk into the structure of the inner cavity of milking teat and into the inner cavernous structure of udder. The research shown that approximately ⅓ of milk volume of milk supplied into the inner cavity of teat before the beginning of closing of the liner is pumped back into the udder by the closing liner. During this step, increase of inner stresses development of "stagnation" processes of blocking of milk in these structures of animal organs takes place, with a possible partial deterioration of its integrity. Moreover, the increase of inner deformation stresses in the teat takes place also during the process of its deforming compressing by the liner, when preliminary swollen in the milking phase teat is relaxed not to an equilibrium state, but passes through the equilibrium state and continuous to be compressed intensely. Therefore, it is necessary to emphasize that the above described dynamic process (as in the previously analyzed "milking phase") has a stress nature and leads to generation of stress hormone, which in turn contributes to a significant worsening of quality of milk and leads to impeding of a milk production. Therefore, it can be summarized that the attempt to relax of the inter structures of the teat and udder performed by the combination of actions on the teat in the "resting phase" of the pulsating milking process not only is simply low efficient, but also additionally causes a series of negative physiological processes.

Also, a possible contact of an end of a teat and a milk volume retained in the cup with the closed linear (since it is difficult to select its size with respect to changing length of the milking teat), and the presence of "reverse flow" of milk through the open channel of teat during this time period create additional favorable conditions for penetration into the structure of the milking teat and udder of viruses and bacteria, which can be located on a surface of an end of the milking teat and or the closed liner. It is known that striking actions of the lower part of the movable liner against an end of the teat are possible, including its possible compressing. This fact can be connected for example with a possible pulling of the teat deeper into the teat cup or the possibility of significant deforming longitudinal lengthening of the milking teat under the action of high vacuum during the process of realization of the "milking phase", and also with possible similar lengthening of the milking teat in the "resting phase". The latter can be caused under the action of two-chamber teat cup, "suspended" on the milking teat by means of the upper part on the compressed movable linear, with a significant weakening of the vacuum "suspension" on the milking teat during the period of minimization of the value of working vacuum in the cup. In turn, these striking actions against the end of the teat can lead to its trauma, and also to a viral inflammation and even decay. These reasons can cause a high probability of infection of these organs of animal and as result mastitis or other known diseases.

In view of the above-mentioned reasons, it is in principal necessary to significantly limit the length of the described "resting phase" within 30-50% of time of each period of milking process. The developers of the milking system have to solve a complicated, practically irresolvable task to find an efficient compromise with selection of length of the other (also problematic) main component of the "milking phase". The necessity to reduce the value of the working vacuum in the cup during "resting phase" with the movable liner leads to a dynamic lowering, (during 15-35% of time of the whole milking process), and then to a complete interruption (during not less than 15% of time of the milking process) of the flow of milk from the teat cup into the milk channel. This substantially increases the total time process of milking and correspondingly its specific energy consumption. Moreover, the technical characteristics of the main structural components which are complicated, bulky, heavy and energy consuming in the milking system, namely a liner and a pulsator which provide the all given characteristics of the milking process, significantly limit the possibility of maintaining and optimization of its dynamic parameters, (with consideration of physiological characteristics of the animal), for example a frequency of pulsation of the linear, a time and also law of its opening and closing, and also the laws of periodic changes of actions on the teat. At the same time, for known reasons, the above mentioned frequency of pulsation of the liner in the milking system which is practically given mainly within the limit 1 Hz, which is significantly different from known optimal frequency of calf sucking (reaching 2 Hz), additionally limits the efficiency of the realized machinery milking process.

Is it obvious that the above listed principal (methodological and process related) disadvantages and limited potential possibilities of the broad applied pulsating machinery milking method used in the milking industry, despite a hundred year of its intense expensive scientific and technological development, can not be efficiently minimized or completely eliminated due to the principal violations in the realized milking process of the physiological essence of the known "reference" natural milking process which is "pseudo-imitated" by this manner.

A relatively low milk-production and energy efficiency of this method accompanied by a high level of diseases in milking animals and relatively low quality of milk produced by it causes serious social, ecological and energy problems of a global nature. They definitely include the necessity of maintaining of a significantly increased number of milking animals and a corresponding increase of number of animal-maintaining spaces, milking equipment, feeder base and additional transportation, and also expenses for utilization of additional wastes in milking industry, and as a result additional high quantity of used-energy resources, additional annual multi-billion expenses for diagnostics and treatment of diseases in animals resulted from the milking process, etc. As a result, the cost of the milk is significantly increased, in particular many times, the cost of milk products is increased well, and also the efficiency of production is reduced in the milking industry and food industry, with lower quality and increased cost of supplied milk.

SUMMARY OF THE INVENTION

Accordingly, it is an object of the present invention to provide a new method of dynamic milking which is based on a new principle.

With the use of optimized modulation of airflow-forming energy in the proposed method, a new era can be open in providing dynamic in-phase vacuum-mechanical actions on a teat and its optimization to revolutionize the method so that the efficiency of the new dynamic machinery milking process can approach to the efficiency of the natural milking process.

The proposed new method of dynamic milking carries out a dynamic machinery milking process with the use of a two-chamber teat cup, which is based on the use of means of modulated vacuum with multi-parameter control for realization of a known "Method of dynamic transporting of object with flow of carrying medium" disclosed in our U.S. Pat. No. 6,827,528 of Dr. A. Relin. The new method is also based on our scientific works and confirmed by a scientific research of a concept of our new theory "Modulating aero- and hydrodynamics of processes of transporting of object with flow of carrying medium", which is patented internationally. The scientific concept considers new dynamic laws connected with significant reduction of various known components of energy losses in turbulent flows (and therefore of specific energy consumption) during creation of a dynamically controlled process of movement of the flow of carrying medium with given dynamic periodically changing sign-alternating acceleration during the process of transporting of object with flow of carrying medium.

The proposed new dynamic machinery milking method allows to minimize or completely eliminate the above-mentioned disadvantages of the known pulsating machinery milking method which is currently used in a milking industry. This is achieved by providing a correct machinery pseudo-imitation of natural milking process considering its physiological essence. In this method utilization of dynamic machinery milking process with two-chamber teat cup, in comparison with a pulsating machinery milking process, is characterized by use of following general technical means:
  Means of constant vacuum;
  Small, lightweight and low energy consumption construction of a principal new block-modulator (or energy-saving dynamic module);
  Small, lightweight and low energy consumption construction of a in principle new element in the two-chamber teat cup, namely the lips instead of the liner;
and it is characterized by:
  Given optimal modulating in-phase vacuum-mechanical actions on the teat, wherein dynamics of its action is provided by parameters of "modulator-lips" system;
  Considerable effective proportion of durations of "milking" and "resting" phases (about 80/20);
  Availability of permanently fully open of a short milk tube for milk movement from the teat, during every period of the milking process;

Considerable decrease (approximately 30%) of maximum vacuum forming in the teat cup, to provide reliability of its vacuum suspension on the milking teat;

Possible considerable increase of frequency (approximately to 2-3 Hz) of vacuum-mechanical actions of the milking teat;

Considerable increase (approximately to 2.5 times) of milking productivity and energy efficiency of the dynamic milking process;

Considerable decrease (approximately to 2-3 times) of milking animal sickness level and considerably improvement of milk quality.

In keeping with these objects and with others which will become apparent hereinafter, one new feature of the present invention resides, briefly stated in a method of dynamic milking realized in a milking system for providing dynamic milking process, for example of cows, which includes:

At least one two-chamber milking teat cup including a shell and at least one hermetic chamber located in its inner cavity, with an inner cavity is connected at least with one input channel of a chamber pressure, a mouthpiece with a milking teat channel and a vacuum chamber located coaxially to a longitudinal axis of the teat cup, and a milk outlet; a milk tank; and a milk channel which connects the milk outlet with the milk tank; at least one source of a given chamber pressure connected with said at least one input channel of chamber pressure;

A cyclic drive means transporting air entrained therein through an enclosed passage, for example a pump, said drive means being interposed between upstream and downstream segments of said passage and comprising a first working zone in a negative drive cycle, connected with said milk tank through a long air channel, and the second working zone in a positive drive cycle, wherein said cycle drive means include a displacement means which include a pressure drop.

At least one movable part of the wall (lips) of said hermetic chamber is composed of an elastic material and located closer to the longitudinal axis of the teat cup with a possibility of movement in a direction of said longitudinal axis over a given distance under the action of a negative dynamic difference of values of cup and chamber pressures.

A method of optimizing at least one value of energy-physiological efficiency of said dynamic milking process characteristic includes the following:

Arrangement of a milking teat into said inner cavity of the shell of the milking teat cup along the longitudinal axis through the milking teat channel of the mouthpiece;

Generation of a given maximum value of negative cup overpressure by connecting by an airflow of said inner cavity of the shell with a first working zone in a negative drive cycle of the cycle drive means through the milk output of the teat cup, milk channel, milk tank and air channel, so as to provide a given maximum value of vacuum action on the surface of said milking teat;

Generation of a given maximum value of said negative dynamic difference of said given maximal value of negative cup overpressure and given maximum value of said chamber pressure by a given connection by an airflow of said inner cavity of a hermetic chamber with said at least one source of a given chamber pressure through said at least one input channel of the chamber pressure, so as to provide a given maximum value of said movement of said at least one movable part of a wall of the hermetic chamber in a direction of said longitudinal axis of teat cup over a maximum distance for providing a given maximum value of mechanical action on said at least one portion of only a lateral part of said surface of milking teat without interrupting of a spatial channel for movement of a milk between an open output of the milk channel of said milking teat and constantly open milk output of said teat cup;

Modulating of values of airflow-forming pressures in said first working zone in said negative drive cycle and second working zone in said positive drive cycle of said cyclic drive means with given parameters of a modulation: a given frequency, a given range, and a given law; and Generation of a given periodic change (or modulation) of said value of chamber pressure in said at least one source of a given chamber pressure, including a given frequency, a given range, and a given law of said change for providing an energy-physiological optimization of given periodic dynamic in-phase vacuum and mechanical actions on said surface of the milking teat.

The method of optimizing said modulating can be carried out for example by a realization of a known "Principle of controlled interior dynamic shunting" of said first and said second working zones of said cycle drive means (see for example U.S. Pat. No. 6,827,528 of A. Relin). In some cases the method of optimizing said modulating can be performed for example (but not limited by it) by means of realization of another known "Principle of controlled exterior dynamic shunting" of a selected part of said connection by the airflow of said inner cavity of the shell of the two-chamber teat cup with said first working zone in a negative drive cycle of said cyclic drive means (see for example U.S. Pat. No. 5,593,252 of A. Relin, et al).

Another important feature of the present invention is that the method of optimizing includes providing a change of at least one value of parameters selected from the group consisting of a given frequency, a given range and a given law of the given said modulating of the value of pressures in said first working zone and said second working zone of said drives (one of possible variants of source of given chamber modulating pressure), and of a given frequency, a given range and a given law of said change of value of pressure at least in one source of the given chamber pressure in said milking process. The changes in the values of said parameters can be performed in accordance with a predetermined program, for example as a function of a time period of carrying out of the milking process, and also manually or automatically for the purpose of providing optimization of the value of at least one parameter influencing on the energy-physiological efficiency of the dynamic milking process. The method of optimizing with the realization of said modulating includes a discrete input, and said optimization includes a parametric input. The proposed method of dynamic milking includes a possibility of the use as the optimized (controlled) parameter, for example the following (but not limited to it):

Value of one of the parameters of the process of dynamic transporting of milking milk from a teat cup, (for example, power, flow rate, optimized specific flow rate, power and velocity);

Value of one of the parameters which operatively reflects a quality of milking milk (for example, density, color and chemical composition);

Value of one of physiological parameters reflecting a current condition of animal during the process of milking (for example, a pulse frequency, blood pressure, temperature of a certain body part, geometric characteristics of a udder or brain biocurrents).

In accordance with other important features of the present invention, in the inventive method of optimizing the source of given chamber pressure can generate a chamber pressure selected from the group consisting of (but not limited to):

Given modulating positive overpressure (for example with the use of said second working zone in a positive drive cycle of said drive means as a source of a chamber pressure);

Given modulating negative overpressure (for example with the use of said first working zone in a negative drive cycle of said drive means or with the use of said cavity of the shell of the teat cup, including the given modulating value of cup negative overpressure—as a technical additional scaleable source of said given chamber pressure) which has at least a part of values less than at least a part of values of the given modulating cup negative overpressure;

Given constant positive overpressure;

Atmospheric pressure;

Given constant negative overpressure having a value, which is less than at least a part of values of the given modulating cup negative overpressure.

The airflow supplied into the hermetic chamber from the source of given chamber pressure includes providing a certain temperature.

The above described important feature of the present invention reflect generally an approach which is proposed by the author and is new in principle for realization of the method of dynamic milking: "Principle of optimizing the controllable dynamic in-phase vacuum-mechanical actions on the teat", which is carried out by an uninterrupted generation of optimized modulation of the value of airflow-forming energy of negative overpressure, applied to a constantly open inner cavity of a shell of a teat cup along its longitudinal axis with a simultaneous generation of a given periodic change (or modulation) of the value of the chamber pressure for providing a given dynamic periodic change of the value of movement of the lips under the action of the given negative difference of the pressures for providing a given dynamic periodic change of the value of mechanical action of the lips at least on one portion of only a lateral part of the surface of milking teat during the whole dynamic milking process, for providing its maximum efficiency. It is important in principle that the movement is carried out without interrupting of said spatial channel for movement of milking milk between an open output of the milk channel of the milking teat and a constantly open milk output of the teat cup.

The invention can be also used for providing other similar physiological processes, which are carried out with the use of exterior actions on certain parts of the body or organs of a human being or an animal and connected with possible artificial taking from them of a liquid physiological substance of a certain type, for example for acting on a male genitals and possible its erection or artificial sperm collection. At the same time in some special milking systems with a single-chamber teat cup, for example for an artificial taking of breast milk from nursing women, it is possible to use the above described method of given modulating of a value of negative cup overpressure in the cavity of the shell of a teat cup can be used, for example with the use of modulated pressure of the first working zone in a negative drive cycle of the modulated drive means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view schematically showing a moment of maximum vacuum-mechanical actions on a milking teat in a "milking phase" of the dynamic milking process;

FIG. 4 is a view schematically showing a moment of minimum vacuum-mechanical actions on a milking teat in a "resting phase" of the dynamic milking process;

FIG. 5 is a view showing a diagram of an example of a given dynamic periodic change of a value of modulating connection between working zones of the pump, provided by a modulator which realizes a "Principle of controlled interior dynamic shunting" of first and second working zones of the pump;

FIG. 6 is a view showing a diagram of an example of a simultaneous given dynamic periodical change (modulation) of a value of airflow-forming of negative overpressure in a first working zone and a value of airflow-forming positive overpressure in a second working zone of the pump;

FIG. 7 is a view showing a diagram of an example of a given dynamic periodic change (modulation) of a value of a negative cup overpressure during the dynamic milking process;

FIG. 8 is a view showing a diagram of an example of a given dynamic periodic change (modulation) of a value of a mechanical action of lips at least on one portion of only a lateral part of a surface of a milking teat during the dynamic milking process.

DESCRIPTION OF THE PREFERRED EMBODIMENTS

A proposed method of dynamic milking can be realized in the following manner.

Figure 1:
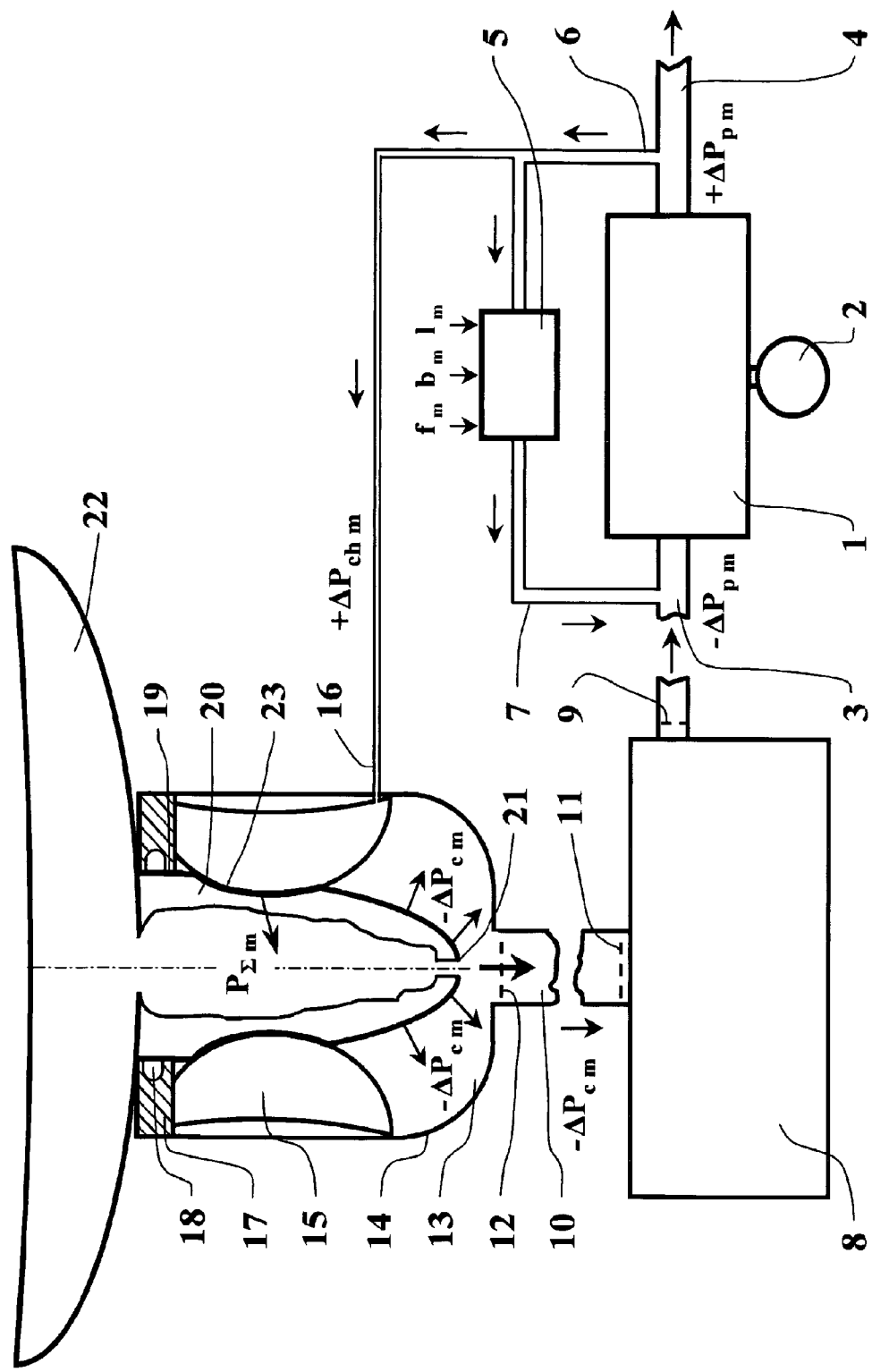
FIG. 1 is a view showing one possible variants of a scheme of a functional structure of a dynamic milking system, with a two-chamber teat cup, which realizes a method of dynamic milking, providing given periodic dynamic in-phase vacuum and mechanical actions on a surface of a milking teat in accordance with the present invention.

One of variants of a dynamic milking system with a two-chamber teat cup is shown in FIG. 1. It includes a pump 1 representing a cycling drive means for transporting air entrained therein through an enclosed passage and having a first working zone in a negative drive cycle and a second working zone in a positive drive cycle. It has further a drive 2 for the pump 1, a suction pipeline 3 and a power pipeline 4, a modulator 5 connected with the power pipeline 4 and a suction pipeline 3 correspondingly through an inlet portion of a shunt channel 6 and an outlet portion of a shunt channel 7 of the modulator 5, a milk tank 8 connected by an air output 9 with the first working zone in a negative drive cycle of the pump 1 through the suction pipeline 3, a short milk tube 10 connecting a milk input 11 of the milk tank 8 with a milk output 12 of a two-chamber teat cup 13 and including a cup shell 14 and a hermetic chamber 15 with a cavity connected with the inlet portion of the shunt channel 6, that perform the function of a source of a given chamber pressure, through an input channel of the chamber pressure 16. It further has a mouthpiece 17 with a mouthpiece chamber 18 and a teat channel 19 for accommodation of a milking teat 20 along a longitudinal axis of the two-chamber teat cup 13. The milking teat 20 has a milk channel with an output 21 and is anatomically connected with an udder of a milking cow 22. A movable part of a wall 23, or lips, of the hermetic chamber 15 is also located along the longitudinal axis of the two-chamber teat cup 13. It is composed of an elastic material and is movable in direction of the longitudinal axis over a given distance under the action of a negative dynamic difference of the value of a cup pressure and the value of a chamber pressure, that are generated correspondingly in a cavity of a cup shell 14 accommodating the milking teat 20 and in the cavity of the hermetic chamber 15.

Figure 2:
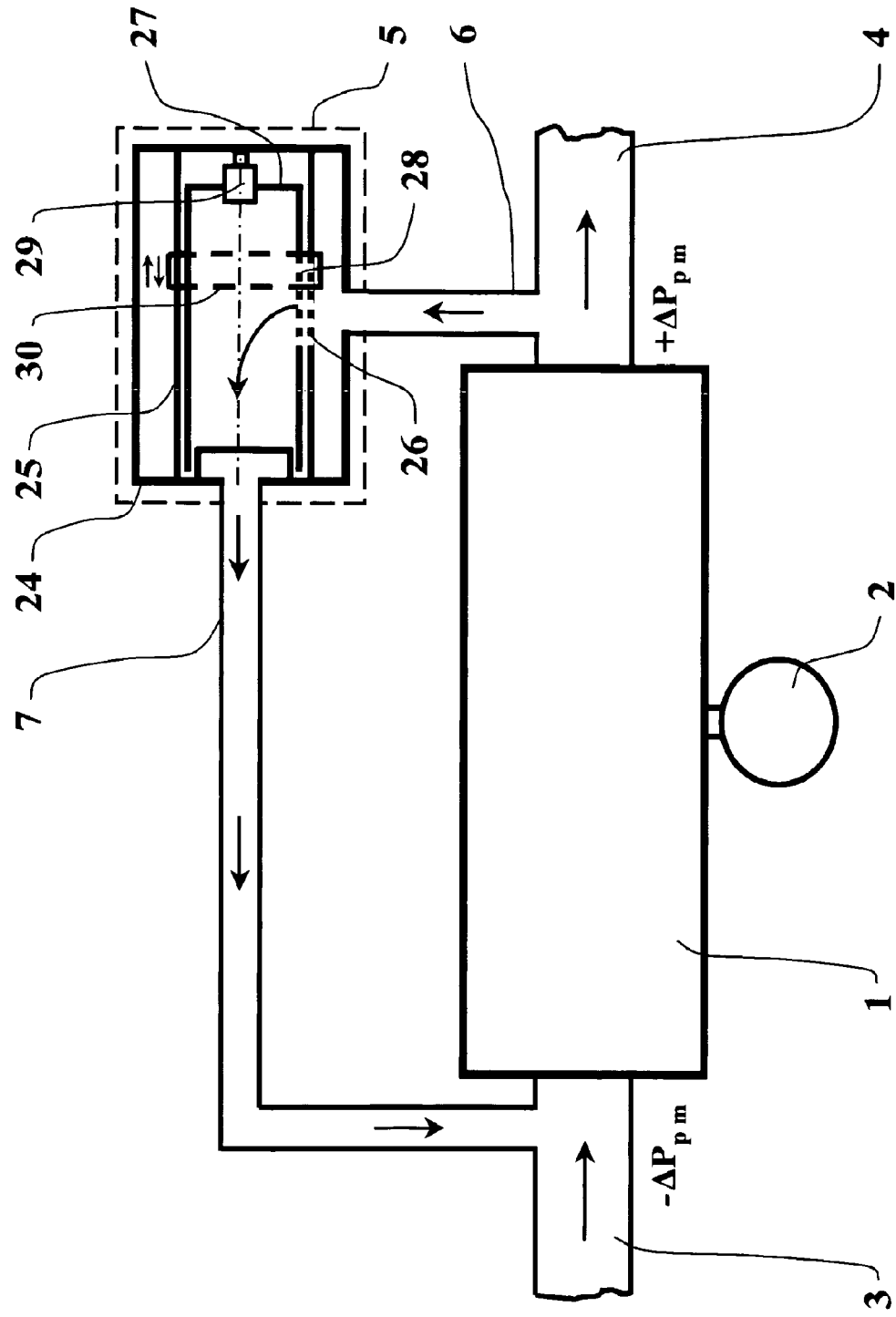
FIG. 2 is a view of one of possible variants a scheme of functional structure of a modulator in a dynamic system with a pump, for carrying out a method of dynamic milking in a dynamic milking system.

The modulator 5 in one of possible variants shown in FIG. 2 provides in the dynamic milking system with the pump 1, realization of a method of dynamic milking. It functionally (generally) includes a body of a valve block 24 whose inner cavity is connected correspondingly by an inlet to an inlet portion of the shunt channel 6 and by an output—with an outlet portion of the shunt channel 7, an immovable cylindrical valve element 25 having a passing channel 26, a movable cylindrical valve element 27 having a passing channel 28, a drive 29 of the movable cylindrical valve element, and a control (ring) element 30. The control (ring) element 30 can have a various shaped width and is used for providing (setting) of initial area and shape of a cross-section of the passing channel, which is formed, by the passing channels 26 and 28 during the process of rotation of the movable cylindrical valve element 27 relative to the immovable cylindrical valve element 25. The control (ring) element 30 has a possibility of a given linear or given angular movement relative to the passing channel 26 for providing (setting) of initial area and shape of a cross-section of the thusly formed passing channel. The above mentioned functional elements of the modulator 5 make possible providing of optimal parameters of its operation, namely a given frequency $f_m$, a given range $b_m$ and a given law $l_m$ of the given modulation of the values of airflow-forming working pressures of the pump 1, as shown in FIG. 1.

The above-described dynamic milking system with a two-chamber teat cup that realizes the method of dynamic milking in accordance with the present invention operates in the following manner.

After turning on the drive 2 of the pump 1, the pump starts generating a working airflow-forming pressure difference $\Delta P_p$, applied to a carrying air medium and generating airflow in the suction pipeline 3 and the power pipeline 4 in FIG. 1. The milking teat 20 is introduced into the cavity of the shell 14 of the teat cup 13 along the longitudinal axis through the teat channel 19 of the mouthpiece 17. Under the action of a maximum value of the negative pressure $-\Delta P_{pm(max)}$ generated by the pump 1 in the first working zone, a given maximum value of the cup negative overpressure $-\Delta P_{cm(max)}$ is provided which includes a given connection by the airflow of the cavity of the shell 14 of the two-chamber teat cup 13 with the first working zone through the milk output 12 of the teat cup 13, a short milk channel 10, the milk tank 8 (with the milk input 11 and air output 9), and the long channel 3 so as to provide generation of a given maximum value of vacuum action on the surface of the milking teat 20.

At the same time the maximum value of the vacuum action generates a suction effect in the mouthpiece chamber 18, which provides a reliable vacuum suspension of the teat cup 13 (in a working plane of the mouthpiece 17) on the milking teat 20. Simultaneously with this, under the action of the maximum value of the positive overpressure $+\Delta P_{pm(max)}$ which is generated by the pump 1 in the second working zone, a given maximum value of the chamber pressure $+\Delta P_{chm(max)}$ is provided, including the given connection by the airflow of the cavity of the chamber 15 with the inlet portion of the shunt channel 6 which performs the function of the source of the given chamber pressure, through the input channel of chamber pressure 16. This provides a given maximal value of the negative difference of the given maximal value of the cup pressure $-\Delta P_{cm(max)}$ and the maximum value of the chamber pressure $+\Delta P_{chm(max)}$ in order to obtain a given maximum value of movement of the lips 23 in direction of longitudinal axis of the teat cup 13 to a given minimum distance from the axis. The minimal distance must be given at least more than a radius of the open output of the milk channel 21 of the milking teat 20 for providing a given maximum value of mechanical action $P_{\Sigma m(max)}$ of the lips 23 only on the lateral portion of the surface of the milking teat 20. Therefore, a moment is provided for maximum vacuum-mechanical actions on the milking teat 20 in a "milking phase" of the dynamic milking process without interrupting (closing) of the spatial channel for movement of a milking milk between the open output of the milk channel 21 of the milking teat 20 and the constantly open milk output 12 of the teat cup 13, as shown in FIG. 3.

In the described initial position of operation of the dynamic milking system, when the modulator 5 is turned off, an area of a cross-section of the thusly-formed passing channel of the valve block equals zero. This correspondingly determines a zero value of the modulating connection between the working zones of the pump $C_{m(0)}$, provided by the modulator which realizes the above mentioned "Principle of controlled interior dynamic shunting" of the first and second working zones of the pump 1. After turning on of the modulator 5, a drive 29 of a movable cylindrical valve element 27 starts to rotate the movable cylindrical valve element. Passing channels 26 and 28 start superposing with one another, which determines a dynamic change of the area of cross-section of the thusly-formed passing channel of the valve block.

When the area of the cross-section of the passing channel reaches a maximal value, a maximal value of the modulating connection by airflow of the working zones of the pump $C_{m(max)}$ is provided. This predetermines reaching of minimal values of the airflow-forming pressures: $-\Delta P_{pm(min)}$ (and correspondingly $-\Delta P_{cm(min)}$) and $+\Delta P_{pm(min)}$ (and correspondingly $+\Delta P_{chm(min)}$). During this stage a minimal value of the negative difference of the given minimal value of the cup pressure $-\Delta P_{cm(min)}$ and minimal value of the chamber pressure $+\Delta P_{chm(min)}$ is provided, in order to obtain a minimal (down to zero) value of movement of the lips 23 in a direction of a longitudinal axis of the teat cup 13, for providing a given minimal value of mechanical action $P_{\Sigma m(min)}$ of the lips 23 on the lateral portion of the surface of the milking teat 20. Therefore a moment of minimal vacuum-mechanical actions of the milking teat 20 is provided in the "resting phase" of the dynamic milking process as shown in FIG. 4.

The given law $l_m$ and the given range $b_m$ of the change (modulation) of the area of the cross-section of the thusly formed passing channel (and therefore of the modulating connection $C_m$ by the airflow of the working zones of the pump shown in FIG. 5) is determined by sizes and shapes of the passing channels 26 and 28, and also by a given shape, longitudinal and angular position of the control (ring) element 30. At the same time, the given frequency $f_m$ of the modulation is determined by a speed of rotation of the drive 29 of the movable cylindrical valve element 27. The selection of the given frequency $f_m$, the given range $b_m$ and the given law $l_m$ of the modulation determines a analogous parameters of modulation (change) of the modulating pressures $-\Delta P_{pm}$ and $+\Delta P_{pm}$ as shown in FIG. 6, and therefore correspondingly $-\Delta P_{cm}$ as shown in FIG. 7, and $+\Delta P_{chm}$ and as a result $P_{\Sigma m}$ as shown in FIG. 8.

The parameters of modulation of the airflow-forming pressures are provided with consideration of obtaining maximum energy-physiological efficiency of periodic modulating vacuum-mechanical actions on the milking teat 20 in the dynamic milking process. In each period ($T_m$) of the dynamic milking process two conditionally defined phases are realized, namely: a "milking phase" ($t_{Mph}$) and a "resting phase" ($t_{Rph}$) as shown in FIGS. 7 and 8. The principal difference of the forming dynamic milking process is that the milking milk can flow beyond the output 21 of the milk channel of the milking teat 20 into the milk tank 8 through the milk output 12 of the teat cup 13 and into the short milk channel 10 practically during the whole period ($T_M$) of the performance of the dynamic milking process. This is provided by the constant cross-section of the thusly formed spatial channel which connects the outlet of the milk channel 21 of the milking teat 20 with the milk tank 8 during the whole dynamic milking process.

In the "milking phase" ($t_{Mph}$), with the above mentioned increasing modulating vacuum-mechanical actions on the milking teat 20, the volume of delivered supplied milking milk is increased to maximum. At the same time in the "resting phase" ($t_{Rph}$) with the decreasing modulating vacuum-mechanical actions on the milking teat 20, the volume of the supplied milking milk is reduced to minimal. This dynamic transportation of the milking milk into the milk tank 8 during the whole dynamic milking process is efficiently provided by the modulating airflow during the realization of the "method of dynamic transporting of object with flow of carrying medium". During this process, as known, the possibility of adhesion (gluing of particles of the transporting milk) on the inner surface of all portions of movement of milk is minimized, and also energy consumption for the transportation is minimized as well.

The modulator 5 can have different schematic and structural solutions, which are connected for example with specifics of the multi-channel valve block or the drive for movement of the control (ring) element 30. For realization of the optimization it is also possible to use various known embodiments of the construction of the energy-saving dynamic module, which includes the modulator and the control block, for example a microprocessor. The control block can have three setting inputs, with which it is possible to set the given frequency $f_m$, the given range $b_m$ and the given law $l_m$ of the given modulation of the value of pressures in the first working zone $-\Delta P_{pm}$ and the second working zone $+\Delta P_{pm}$ of the pump 1 (a source of modulating pressure drop). To the fourth input of the control block it is possible to supply a signal of a feedback with a sensor, which reflects the value of the above-mentioned optimizing (controlling) energy-physiological parameters of the milking process. In addition, the control block can have three controlling outputs, which correspond to the setting inputs. One output is connected with the drive 29 of the movable cylindrical valve element 27 for regulation of the frequency $f_m$, while two other outputs can be connected for example with an electromagnetic drive providing the possibility of the given linear displacement (for regulation of the given range $b_m$) or given angular displacement (for regulation of the given law $l_m$) of the control (ring) element 30. The control block can realize various algorithms of a single- and multi-parameter regulation control of the parameters of the modulation for providing a single- or multi-parametric optimization of the controlling energy-physiological parameters of the milking process. The cross-sections of the passing channels 26 and 28, correspondingly, of the valve elements 25 and 27 of the modulator can have a given complicated shape to realize relatively complicated given low $l_m$ of the modulation of airflow-forming pressures.

One of the possible variants of the functional construction of the modulator, which is a new so-called "shell" variant, is shown in FIG. 1 and can be a universal schematic solution for producing modulators for different applications with a hollow shell. In some schematic solutions of the modulator the independent control (ring) element 30 can be emitted. The functional role of this element can be carried out for example either by a structure of the valve element 25, which is movable in the longitudinal and angular directions, or by a structure of the valve element 27 which is movable in the longitudinal direction, (possibly with its drive 29). In addition, it is advisable to arrange the modulator in immediate vicinity to the first working zone in a negative drive cycle of the pump 1. This location of the modulator allows to significantly improving dynamic parameters of the process of dynamic connection of the working zones of the pump due to significant reduction of the time of "running" of a commutation wave of pressure in the shunting channel (portions 6 and 7).

Various variants of the construction of the modulator and various algorithms of operation of the intellectualized energy-saving dynamic module are described in detail, for example in the above mentioned our U.S. patents.

In addition, the movable part of the wall, namely the lips, 23 of the hermetic chamber 15 can have a different shape of profile, which contacts with the milking teat 20 during its displacement in the direction of the longitudinal axis of the two-chamber teat cup 13. The contact can be performed both along an uninterrupted strip, and also in one or several local zones of the lateral surface of the milking teat 20. This opens qualitatively new possibilities for physiological optimization of the mechanical action on the milking teat. The movable part of the wall 23 can be composed, for example, of a homogeneous elastic material with given characteristics, and also of a multi-component material which has for example longitudinal or transverse reinforcing flexible elements (synthetic or metallic) integrated in its polymeric structure.

The mouthpiece chamber 18 of the mouthpiece 17 can have various structural solutions in order to increase the reliability of retention of the two-chamber teat cup 13 on the milking teat 20 in an extreme period of minimization of the reducing modulating vacuum-mechanical actions on the milking teat 20 in the "resting phase" ($t_{Rph}$). For example the mouthpiece chamber 18 can be provided with lever-mechanical flexible element, which is movable in the extreme period in direction of the teat 20 with minimization of the negative residual pressure in the chamber 18, for maintaining an initial position of the two-chamber teat cap 13 on the milking teat 20.

The short milk tube 10 can be provided with a manual flap, for closing its cross-section during the periods of introduction (or withdrawal) of the milking teat 20 into (from) the two-chamber teat cup 13. This device, which is actually a "switch" of pressure of the teat cup, provides a comfort for the periods of introduction and withdrawal of the milking teat 20 due to the reduction of a negative cup pressure during these periods practically to zero.

The flow of air supply under pressure into the hermetic chamber 15 from the source of the given chamber pressure can have a regulatable (or dynamically changeable) temperature. The temperature (negative and/or positive) can be provided by a controlled additional temperature device, incorporated in the source of the chamber pressure or in the input channel of the chamber pressure 16. The movable part of the wall (lips) 23 must be composed from a heat-conductive elastic material. This technical solution provides a new methodological possibility of a temperature controlled action on the milking teat 20, which significantly expands the possibility of the energy-physiological optimization of the dynamic milking process, due to improvement of physiological processes in the milking teat, for example, a blood circulation.

Preliminary analytical investigations conducted by the inventor together with Dr. Ion Marta (U.S.A.) and analysis of the "milking phase" in the dynamic milking process allowed to determine the possibility of providing in it the high energy-physiological efficiency of the realized given periodic in-phase vacuum and mechanical actions on the surface of the milking teat 20. The "milking phase" of the dynamic machinery milking process (in comparison with the known pulsating machinery milking process) is characterized by the following:

reduced (approximately 20%) maximum vacuum action on the milking teat taking into consideration reduced (approximately 50%) weight of the lips, when compared with the weight of a liner;
  available maximum mechanical action on the milking teat that limits possibility of its volume stretch, provide pressing of milk from the teat and a possibility of more (approximately 20%) reduction of maximum vacuum action on the milking teat.

This in turn determines a considerable minimization (or absence) of the following physiological problems:

outflowing of the blood and lymph to the end of the milking teat;
  swelling of the milking teat;
  deformation of the internal structure of the milking teat;
  blocking of the milk in the milking teat and the cavernous structure of the udder;
  deformation of length and stretch of the milking teat;
  inflammation of the milking teat tissues;
  edema in the milking teat (supplementary discomfort or suffering for cow);
  elimination of the stress hormone (adrenalin).

In addition the "milking phase" of the dynamic machinery milking process (in comparison with known pulsating machinery milking process) is characterized by the following:

considerable minimization of possibility of milking difficulties (or its blocking) and worsening milk quality; and also
  possibility of considerable increase in duration (to 80%) in every period of the milking process that considerably reduces the general time of milking process and its specific energy consumption.

Therefore, the "milking phase" of the dynamic machinery milking process provides a machinery pseudo-imitation of the "milking phase" of the natural milking process.

Analogous preliminary analytical investigations and analysis of the "resting phase" in the dynamic milking process also allowed to determine a possibility of providing in it of high energy-physiological efficiency of the realized periodic dynamic in-phase vacuum and mechanical actions on the surface of the milking teat 20. The "resting phase" of the dynamic machinery milking process (in comparison with the known pulsating machinery milking process) is characterized by the following:

minimum vacuum action on the milking teat;
  minimum (or absence) of the mechanical action on the milking teat, that provides the possibility of recovery of its normal state;
  possibility of considerably decreasing duration (to 20%) and continuation of open state of the short milk tube for milk movement from the milking teat;
  continuation of milk flowing from the milking teat;
  absence of a "reverse flow" of the milk to the end of the milking teat so that the milk is not "pumped" back up, that considerably minimizes (or eliminates) hydrodynamic traumatization of an internal structure of the milking teat and the internal cavernous structure of the udder;
  considerable minimization (or elimination) of internal deformational tensions in the milking teat and elimination of the stress hormone contributing to increase of efficient relaxation of the internal structure of the teat (and the udder) and considerable improvement of milking and milk quality;
  considerable minimization (or elimination) of conditions for penetration in the internal structure of the milking teat (and udder) of different viruses or bacteria with the open milking teat duct from the surface of the milking teat and therefore considerable minimization of probability of a miring of teat into the teat cup;
  elimination of shock actions of the lips part on the milking teat end or its jamming, that considerably minimizes or eliminates the probability of its traumatization, viral inflammation or putrification.

Therefore, the considered "resting phrase" of the dynamic machinery milking process provides a machinery pseudo-imitation of the "resting phase" of the natural milking process.

It can be summarized that the inventive dynamic machinery milking process is a complex machinery pseudo-imitation analogues of the "milking phase" and "resting phase" of the natural milking process. The specific energy consumption of dynamic machinery milking process (in comparison with the known pulsating machinery milking process) may be reduced to two-three times. This result is caused by two important analyzed possibilities of the process.

Firstly, energy consumption (in comparison with the known pulsating machinery milking process) can be reduced up to two times with the consideration of:

possible reduction (about 30%) of the required initial pressure of the pump, connected with the reduction of weight of the two-chamber teat cup with lightweight lips, and the possibility to reduce the value of maximum vacuum action on the teat with the mechanical action on it in the "milking phase";
  possible reduction (about 20%) of the mean acting pressure from its initial (maximal) value due to its modulation by means of the modulator during the realization of the dynamic machinery milking process.

Secondly, the duration of the dynamic machinery-milking process (in comparison with the pulsating machinery milking process) can be increased about 1.5 times with consideration of the following:

possible increase of duration of the "milking phase";
  possible flowing out of milk from the milking teat in the "resting phase"; and
  possible increase of quantity of periodically repeating cycles of milking of the teat per time unit, due to the possible increase of the frequency of modulation of pressures, for example to 2 Hz or more.

Therefore for the first time the new concept of dynamic milking process provides the principal new possibility of the following:

optimization of dynamic parameters of modulated vacuum action ($-\Delta P_{cm}$) on the milking teat (frequency $f_{cm}$, range $b_{cm}$, law $l_{cm}$) which is provided by the modulator;
  optimization of dynamic parameters of modulated mechanical action ($P_{\Sigma m}$) on the milking teat, which is provided by dynamic parameters (frequency $f_{chm}$, range $b_{chm}$, law $l_{chm}$) of pressure which is introduced into the teat cup chamber ($+\Delta P_{chm}$) and dynamic parameters of the modulated vacuum action ($-\Delta P_{cm}$) on the teat 20.

Summarizing, of the above the optimizing possibilities provide given optimization of controlling technological parameter (criterion) of the dynamic machinery milking process (for example, current milking productivity or specific energy consumption). In various dynamic milking systems it is possible to use also other (not limited by the above) possible variants (or their selected combination) of the given chamber pressure $\Delta P_{ch}$:

- constant positive overpressure;
- atmospheric pressure;
- constant negative overpressure which has a value lower than at least a part of values of the dynamic periodically changing cup negative overpressure;
- modulated negative overpressure, for example by using the first working zone in a negative drive cycle of the drive means or by use of the cavity on the shell of the teat cup with the given modulating of the value of the cup negative overpressure, as a technically additionally scalable source of the given chamber pressure. At least a part of the values of the modulating negative overpressure, which is periodically supplied into the chamber, must be lower than at least a part of values of the given dynamically periodically changing cup negative overpressure.

These circumstances significantly expand the possibility of optimization of dynamic parameters (law $l_{\Sigma m}$ and range $b_{\Sigma m}$) of the modulated mechanical action ($P_{\Sigma m}$) on the milking teat 20.

Therefore the proposed concept of dynamic milking technology allows revolutionizing the possibilities of the milking machinery process and significantly increasing its energy-physiological efficiency. The new dynamic milking technology will find extensive use in various fields of multi-billion dollar machinery milking world market which can cover millions of different (similar to the above described) dynamic milking systems, for example for milking cows, goats, ewes or mares. Such systems can be developed in form of portable dynamic milkers or dynamic multi-point milking systems.

The variants of the new dynamic milking systems can be created for different parameters of basic technological system's components, such as pumps, milk lines, teat cups, milk tanks, etc., with the use of different functional modifications of the modulator or energy-saving dynamic module for one-parametric or multi-parametric optimization of the dynamic milking process.

At the same time, it is possible to develop and manufacture so-called "Dynamic" Kits of the new basic technological system components to adjust the traditional portable milkers and multi-point milking systems with the aim of realization of the dynamic milking technology. The "Dynamic" Kits can include, for example the modulator or energy-saving dynamic module, a set of new type teat cups with lips, and sets of different structural elements. Such "Dynamic" Kits can be also provided for different parameters of the basic technological system components, such as pumps, milk liners, teat cups, milk tanks, etc, and different types of traditional portable milkers or multi-point milking systems, and also for consideration of the problem of optimization of the dynamic milking process.

A preliminary evaluation of potential efficiency of use of the new dynamic milking technology for worldwide milking industry shows the principally new potential possibilities of the new dynamic machinery milking process:

- increase of the milking productivity about 1.5-2.5 times;
- decrease of animal sickness level about 2-3 times;
- significant improvement of quality of milking milk;
- reduction of specific energy consumption about 2-3 times.

These principally a new potential possibilities of the new dynamic machinery milking process predetermine substantial possible changes for the worldwide milking industry, for example a possibility of staged reduction of the required number of milking cows about 1.5-2.5 times. In turn, this can lead correspondingly to the possibility of practically proportional reduction of required surface of cow-sheds, required quantity of fodder, number of staff and milking systems, total energy consumption, transportation expenses, etc. The above listed factors also determine the possibility of significant reduction (several times) of the cost of milking milk and, as a result of it, of milk products to be produced from it. In addition, this also determines the possibility of obtaining a multi-billion dollar economic effect connected with solution of known general humanitarian foods, ecological, energy and social problems.

It will be understood that each of the elements described above, or two or more together, may also find a useful application in other types of methods and constructions differing from the type described above.

While the invention has been illustrated and described as embodied in method of dynamic milking, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

The invention claimed is:

1. A periodic process of dynamic milking, comprising the steps of:
    arranging a milking teat having a milk channel with a milk output into a teat cup having a milk output;
    generating in the teat cup a vacuum action, permanently communicating with the milking teat for vacuum acting on the milking teat, and
    providing in the teat cup a mechanical action on at least one lateral part of the milking teat for mechanical acting on the milking teat;
    modulating the vacuum action without interrupting a spatial channel for movement of a flow of milk between the milk output of the milk channel of the milking teat and the milk output of the teat cup;
    selecting a modulating frequency to provide a modulating period;
    predetermining and providing a milking period including a milking phase and a resting phase of the periodic process of dynamic milking each phase having a phase duration, the modulating having a modulating range providing a change of a value of the vacuum action between a maximal value and a minimal value, and a modulating law providing a form of the change of the value of the vacuum action during each milking period; and
    changing the mechanical action without interrupting the spatial channel for movement of the flow of milk between the milk output of the milk channel of the milking teat and the milk output of the teat cup,
    the changing having a changing range providing a change of a value of the mechanical action between a maximal value and a minimal value, and a changing law providing a form of the change of the value of the mechanical action during each milking period such that an increase of the mechanical action occurs at the same time as an increase of the vacuum action on the milking teat, each to the respective maximal value during the phase duration of the milking phase, and a decrease of the mechanical action occurs at the same time as a decrease of the vacuum action on the milking teat, each to the respective minimal value during the phase duration of the resting phase, such that the increasing and decreasing of the vacuum action and the mechanical action provide in-phase modulating and changing, respectively, in each milking period to cause the flow of milk without interrupting the spatial channel for its movement between the milk output of the milk channel of the milking teat and the milk output of the teat cup for an energy-physiological optimization of the periodic process of dynamic milking.

* * * * *